Jan. 26, 1960     E. WILDHABER     2,922,294
TOOTHED COUPLINGS
Original Filed May 2, 1956     4 Sheets-Sheet 1
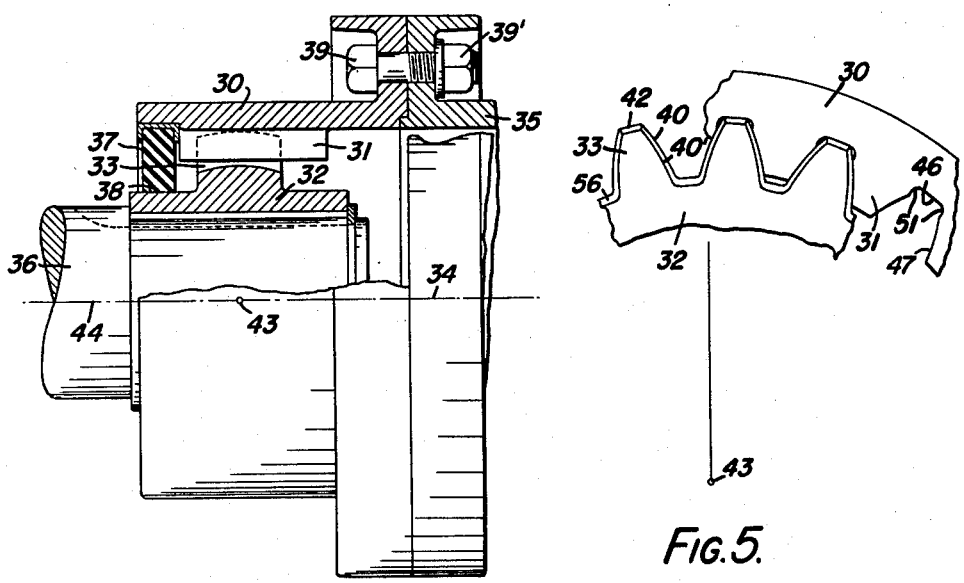
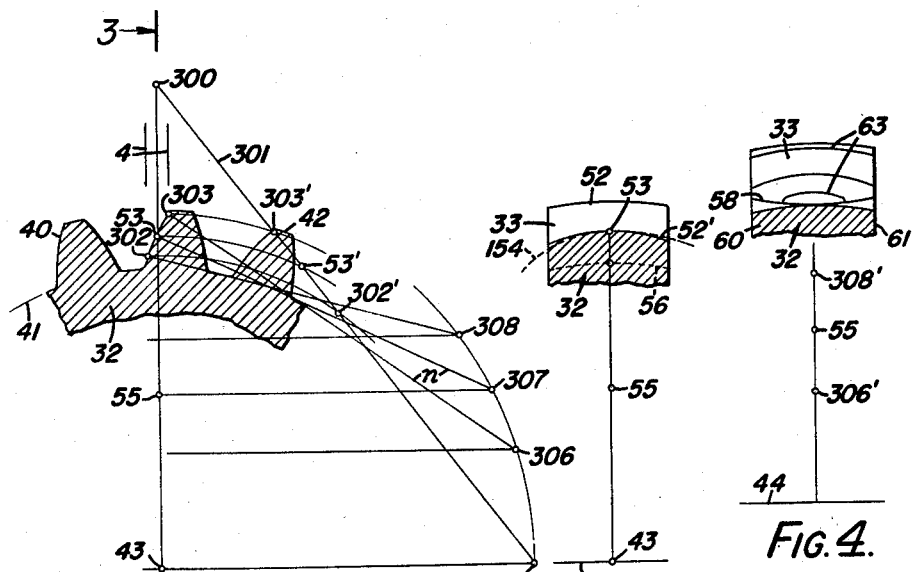
INVENTOR.
ERNEST WILDHABER
BY
ATTORNEY

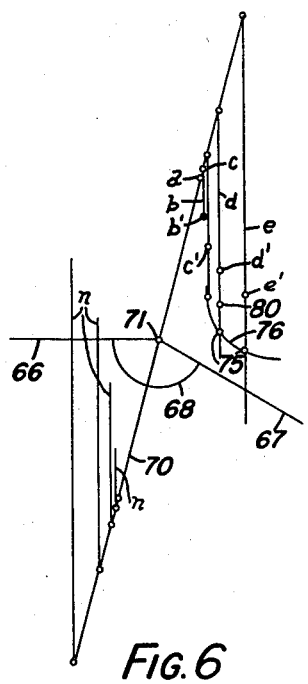
FIG. 6
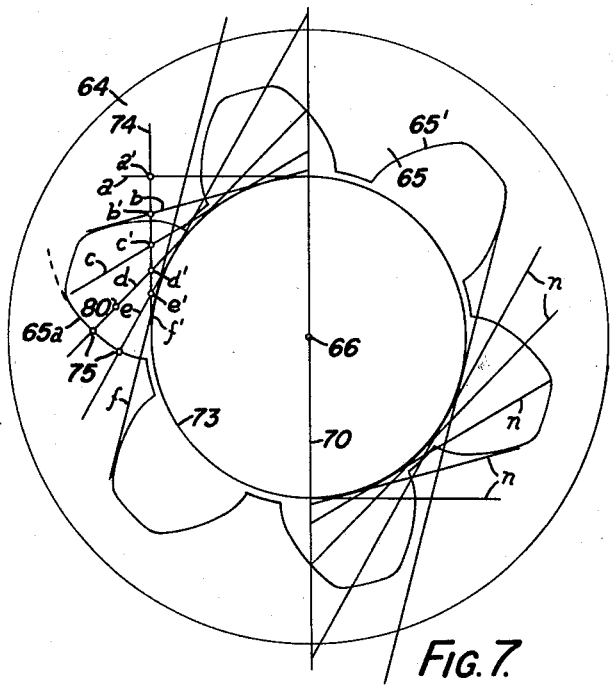
FIG. 7
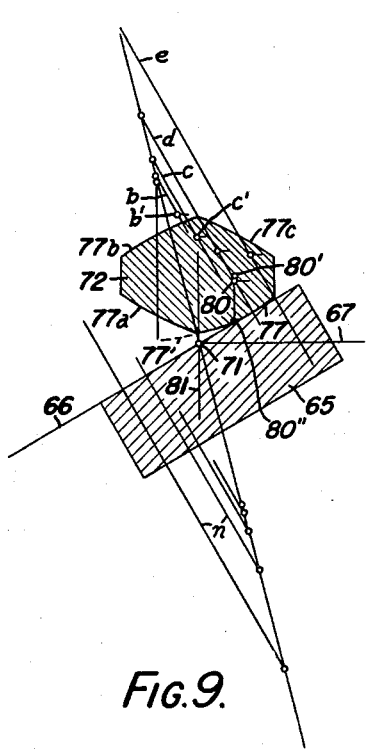
FIG. 9
FIG. 8
INVENTOR.
ERNEST WILDHABER
BY
ATTORNEY Jan. 26, 1960    E. WILDHABER    2,922,294
TOOTHED COUPLINGS
Original Filed May 2, 1956    4 Sheets-Sheet 3
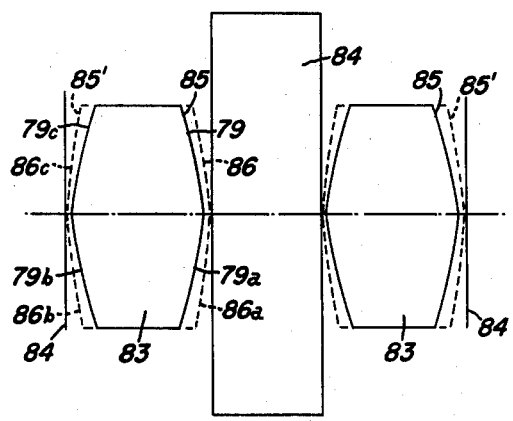
FIG.10.
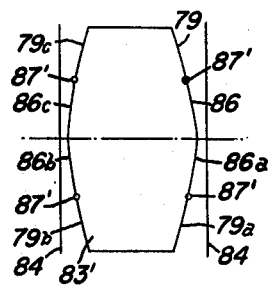
FIG.11.
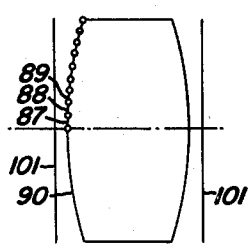
FIG.12
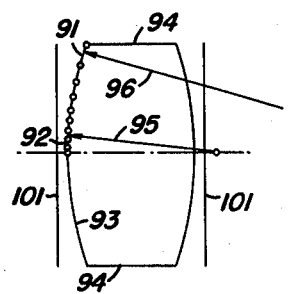
FIG.13.
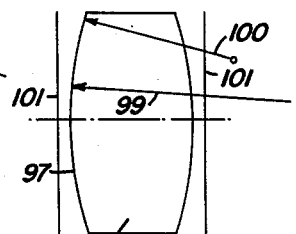
FIG.14.
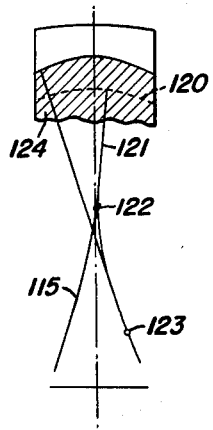
FIG.18.
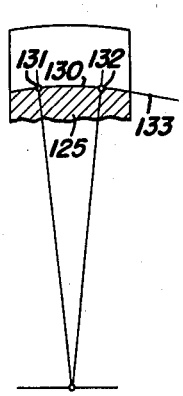
FIG.17.
FIG.15.   FIG.16.
INVENTOR.
ERNEST WILDHABER
BY
ATTORNEY Jan. 26, 1960  E. WILDHABER  2,922,294
TOOTHED COUPLINGS
Original Filed May 2, 1956  4 Sheets-Sheet 4

INVENTOR.
ERNEST WILDHABER
BY
ATTORNEY

United States Patent Office 2,922,294
Patented Jan. 26, 1960

2,922,294
TOOTHED COUPLINGS
Ernest Wildhaber, Brighton, N.Y.

Original application May 2, 1956, Serial No. 582,961. Divided and this application April 18, 1957, Serial No. 653,688

15 Claims. (Cl. 64—9)

The present invention relates to toothed couplings and more particularly to toothed couplings comprising an internally toothed member and an intermeshing externally toothed member. In a more specific aspect, the invention relates to toothed couplings in which the internally toothed member has straight teeth and engages an externally toothed member whose teeth are crowned lengthwise. More especially the invention relates to toothed couplings having teeth of strongly curved profile.

This application is a division of my pending application, Serial No. 582,961, filed May 2, 1956, which covers the method and a machine for producing toothed coupling members of the present invention.

It has long been recognized that in a toothed coupling comprising an internal member and an external member, the teeth of the external member should be crowned to obtain smoother action at shaft angularity, and to reduce the backlash required between the teeth of the intermeshing members. In a paper No. 47–SA2 entitled "Semi Universal Toothed Couplings" presented by me before the American Society of Mechanical Engineers in June 1947, I have analyzed the action of couplings having plane tooth surfaces and tooth surfaces moderately curved in planes perpendicular to the coupling axis, and have shown how the different teeth of such couplings tend to transmit different motion. The transmitted motion changes from a smooth motion at small shaft angularities to a rough motion at large shaft angularities.

One object of the present invention is to put the tooth shape on an exact basis.

Another object of the invention is to eliminate existing inaccuracies in couplings of the character described, and to provide a correct shape for the teeth of such couplings.

Another object of the invention is to provide toothed couplings having tooth surfaces that will transmit true uniform motion at different shaft angularities.

Another object of the invention is to remove the limitations heretofore applying to toothed couplings and to broaden their range.

Other objects of the invention are to provide a toothed coupling of increased strength, and a toothed coupling that will operate at larger shaft angularities.

Another object of the invention is to provide a toothed coupling having stronger teeth, and in which the undercut at the tooth ends of the external coupling member will be reduced, especially on coarse-pitch members such as required for ample shaft angularities.

Other objects of the invention will be apparent hereinafter from the specification and from the recital of the appended claims.

In the drawings:

Fig. 1 is a part axial section, part side view of a coupling made according to one embodiment of this invention;

Fig. 2 is a fragmentary transverse section of the externally toothed inner member of this coupling, and showing diagrammatically, also, the basis of certain structural features of the teeth;

Fig. 3 is a section on the line 3—3 of Fig. 2;

Fig. 4 is a combined sectional view showing, superimposed on one another, sections taken in the parallel planes 4 of Fig. 2;

Fig. 5 is a fragmentary end view of a coupling such as shown in Figs. 1 to 4 inclusive;

Figure 19:
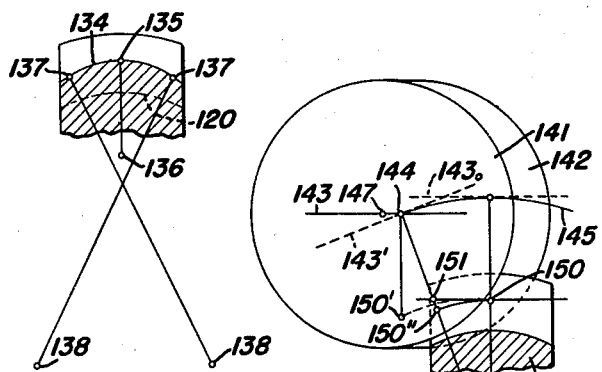
Figure 20:
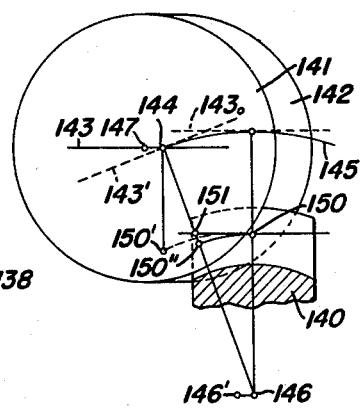
Figure 21:
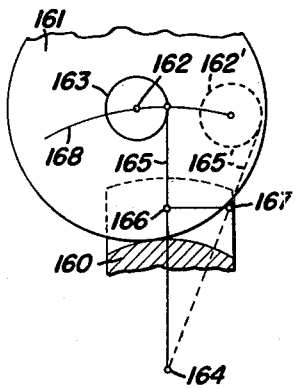
Figure 22:
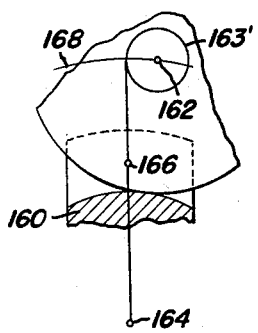
Figure 23:
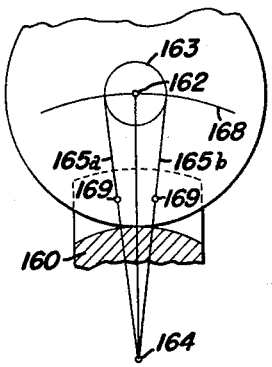
Figure 24:
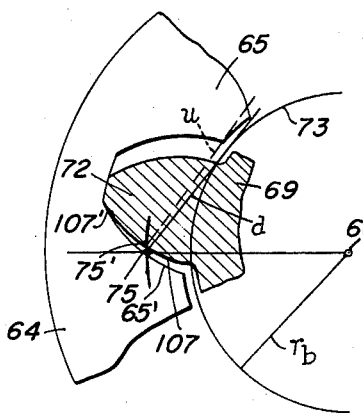

Figs. 6 to 9 inclusive are diagrammatic views illustrating the mesh of the members of a coupling constructed according to this invention where the coupling has fixed shaft angularity, Fig. 6 being a view taken at right angles to the axes of the two coupling members, Fig. 7 being an end view of the internally toothed outer member, Fig. 8 being a view along the axis of the externally toothed inner member, and Fig. 9 being a view similar to that of Fig. 6 except for its position, and further showing the developed toothed shape;

Fig. 10 is a development to a plane of a cylindrical section coaxial with the externally toothed inner member of a fixed angle coupling made according to this invention, and showing, also, a tooth of the meshing internally toothed outer member;

Fig. 11 is a diagrammatic developed view, similar to Fig. 10, showing the combined tooth shape that may be employed on the externally toothed inner member of the coupling so that the coupling may operate at two different shaft angularities;

Fig. 12 is a diagrammatic developed view, similar to Fig. 10, showing the shape suitable for all shaft angularities within a given range;

Fig. 13 is a diagrammatic developed view, similar to Fig. 10, showing the shape for the teeth of the externally toothed inner member of another form of universal coupling intended to run about equally at all shaft angularities within its range;

Fig. 14 is a diagrammatic developed view, similar to Figs. 12 and 13, showing a further modification of the invention;

Fig. 15 is a fragmentary axial section, showing a side view of the teeth of the externally toothed inner member of a fixed angle coupling, and showing, also the lines of instantaneous tooth contact of such a coupling member with a mating internally toothed member having plane tooth sides;

Fig. 16 is a fragmentary axial section, similar to Fig. 15, but showing the lines of contact of the externally toothed member when it is in engagement with an internally toothed member having involute tooth profiles;

Fig. 17 is a fragmentary axial section of the externally toothed inner member of a universal coupling made according to a modification of the invention and having modified tooth space bottoms;

Fig. 18 is an axial section similar to Fig. 3, but showing a tooth of a coupling having a different form of crowning;

Fig. 19 is an axial section like Fig. 18, further illustrating this form of crowning;

Fig. 20 is a diagrammatic view illustrating one way of hobbing the teeth of an externally toothed inner coupling member and illustrating the inaccuracies which occur in the conventional method of hobbing such teeth;

Fig. 21 is a fragmentary axial section diagrammatically illustrating a way of hobbing one side of the teeth of an externally toothed inner coupling member according to this invention;

Fig. 22 is a fragmentary diagrammatic view, similar to Fig. 21, showing the method of hobbing the opposite side of the teeth of the externally toothed inner coupling member according to this invention;

Fig. 23 is a diagrammatic view, similar to Figs. 21 and 22, and illustrating a method of hobbing simultaneously both sides of the teeth of an externally toothed inner coupling member according to this invention; and Fig. 24 is an axial view of an outer and inner member, such as disclosed in Figs. 6 to 9 inclusive, in contact with their axes in alignment, the inner member being shown in a section through its mid-plane (plane 81 of Fig. 9).

The present invention relates chiefly to coupling members having teeth of curved profile and particularly of involute profile. I have discovered that in a coupling comprising an internally toothed outer and an externally toothed inner member, true uniform motion can be transmitted with the proper form of teeth even at substantial shaft angularities provided that the tooth profiles are strongly curved. The toothed surfaces required on the externally toothed inner member differ from surfaces of revolution and are best obtained by generation with a rotary tool such as a hob, shaving tool, or a threaded grinding member, whose turning motion is timed to the rotation of the work. Existing hobbing and shaving processes for the crowned externally toothed coupling member, however, do not provide the exact required shape as will be shown. The invention defines exact shapes that transmit true uniform motion.

The couplings, to which the present invention relates, may be used either in pairs, or singly. Each comprises an internally toothed outer member and an externally toothed inner member, such as the members 30 and 32 of Fig. 1. The internally toothed outer member 30 has straight teeth 31; and the externally toothed inner member 32 has crowned teeth 33.

The coupling illustrated in Fig. 1 is for moderate shaft angularities. The teeth 31 extend parallel to the axis 34 of the internally toothed outer member 30. This member is rigidly secured, as by means of bolts 39 and nuts 39', to a part 35. Part 35 may be another internally toothed outer member similar to member 30, or it may be rigid with a shaft or the like. The externally toothed inner member 32 is rigidly secured to a shaft 36. A seal 37, which is inserted in and secured to the outer end of the member 30 and which cooperates with a cylindrical surface 38 of the member 32, serves to seal a lubricant around the coupling teeth.

The profiles of the teeth 31 and 33 of the two coupling members are sharply curved, and are preferably involutes. The profile shape of the externally toothed inner member is shown in Fig. 2, which is a mid-section through it. The profiles 40 of the teeth of this member are involutes having a base circle 41. The tooth tops 42, preferably lie in a spherical surface centered at 43 (Fig. 5) on the axis 44 of the member 32; and if desired, the tooth tops 42 of the externally toothed inner member may bear, for centering, against the cylindrical root surface 46 (Fig. 5) of the internally toothed outer member 30. To avoid sharp corners at the roots of the teeth 31 of the internally toothed outer member, and yet avoid interference, the tooth surface 47 of this member may be joined to its root surface 46 by rounded fillet portions 51.

Fig. 3 shows how the tooth surfaces 52 of member 32 are curved lengthwise at its mean point 53 (Fig. 2). The curvature radius of the sectional longitudinal profile 52' of a tooth surface 52 at a point 53 is swung about a center 55 intermediate the tooth surface 52 and the axis 44, while the lengthwise shape of the tooth bottom 56 is preferably centered at 43 on the axis 44. In other words, the tooth tops 42 (Fig. 5) and the tooth bottoms 56 are concentric, while the sectional longitudinal profile 52', intermediate the tops and bottoms of the teeth, is eccentric of the tops and bottoms of the teeth.

How this tooth shape can be achieved will be shown hereinafter. It will also be shown how the pressure angle or profile inclination changes along the teeth 33 and becomes similar at both ends, and how the potential working surface of the crowned member terminates at a base line 58 (Fig. 4) which is concavely curved and is turned up at both ends 60 and 61 of the teeth.

Fig. 4 illustrates the shape of a tooth surface by its longitudinal section lines 63 taken in the parallel planes 4 in Fig. 2. The tooth surface differs from a surface of revolution in which the base line 58 would follow the tooth bottom.

The change of pressure angle, or profile inclination, along the teeth is illustrated in the end view of Fig. 5. The end top to bottom profiles 40' of the teeth are inclined somewhat to the central profiles 40 and tend to be more undercut. The tendency of undercut at the tooth ends becomes more pronounced when a coarser pitch is used than now customary, to increase the strength of the coupling. It is further accentuated when the tooth bottom has a curvature center such as 55 (Fig. 2), as in many existing couplings. It is mitigated when the tooth bottoms 56 are less curved lengthwise than the mid-height lengthwise curvature 52', in accordance with the present invention.

Let us take a fixed angle coupling and consider the surface of action between an internally toothed outer coupling member 64 (Fig. 7) having longitudinally straight teeth 65 and its axis at 66, and an externally toothed inner member 69 having teeth 72 (Fig. 9) conjugate thereto and having its axis at 67 (Fig. 6).

Kinematically the coupling acts like a gear. There is an instantaneous axis 70 which passes through the intersection point 71 of the axes 66, 67. It bisects their shaft angle 68, because the transmission ratio is 1:1. The line of instantaneous contact between the two coupling members in any one turning position is the projection of the instantaneous axis 70 to a tooth surface, that is, to a side surface of a straight tooth 65. This side surface has a concavely curved top to bottom, or depthwise, profile 65' and engages teeth 72 (Fig. 9) of convex profile. The profile 65' shown are involutes, having a base circle or base cylinder 73.

The surface of action of involute teeth contains all the straight surface normals that intersect the instantaneous axis. Each normal is a path of contact between the two meshing members, because a normal to an involute tooth surface remains a surface normal at all turning positions. It continues to fulfill the condition of contact in all turning positions, once it fulfills that condition in one of the turning positions.

Accordingly, the normals $a$, $b$, $c$, $d$, $e$, $f$ (Fig. 7) are potential contact normals, and define the surface of action. They are tangent to the base cylinder 73 and intersect a plane 74 (Fig. 7), which is tangent to this base cylinder, at points $a'$, $b'$, $c'$, $d'$, $e'$, $f'$. Plane 74 is parallel to the drawing plane of Fig. 6.

To construct the normals in a view along the axis 67 of the crowned externally toothed inner member, the intersection points $a'$, $b'$, $c'$, $d'$, $e'$ are projected from Fig. 7 to Fig. 6, transferred to Fig. 9, and projected from there to Fig. 8. Also the intersection points of the normals with the instantaneous axis 70 are projected. The normals $a$, $b$, $c$, $d$, $e$, can now be drawn in Fig. 8 as the connecting lines of two such corresponding intersection points.

To construct an instantaneous line of contact with a tooth surface 65a (Fig. 7) at any turning position, the intersection points 75 of the normals $a$, $b$, $c$, $d$, $e$ with said tooth surfaces are projected from Fig. 7 to Fig. 6. They can also be projected to other views. In this way a curved line 76 (Fig. 6) is obtained as the line of contact.

One way of defining the tooth shape of the externally toothed inner member is to give its intersection line with one or more cylindrical surfaces coaxial with said member. The intersection line 77 with a mean cylindrical surface 78 (Fig. 8) is shown in Fig. 9 in the development of this cylindrical surface to a plane. It is obtained by first locating the intersection point 80 (Fig. 8) of each normal $a$, $b$, $c$, $d$, $e$ with the cylindrical surface 78, and projecting that intersection point to the normal shown in Fig. 9. From there it can be directly transferred to Fig. 6, which is a view in the same direction, and then projected to Fig. 7. The normal distance of a projection 80 (Fig. 7) from a reference tooth surface, such as 65a (Fig. 7) indicates the turning angle required to move this point about the axis 66 into the surface 65a. The turning angle is the proportion of said normal distance to the radius of base circle 73 in radian measure.

The same turning angle applies to the externally toothed inner member and to axis 67.

Now we develop the cylindrical surface 78 in a plane, whereby point 80 moves to a position 80' (Figs. 8 and 9). Front point 80' we plot a distance 80'—80'' (Fig. 9) which distance represents the aforesaid turning angle measured as an arc on the cylindrical surface 78. Other points 80'' are similarly attained. Sought intersection line 77 with the cylindrical surface 78 is the connecting line of the various points 80''.

Couplings made according to the present invention may take the place of angular gear drives. They differ from angular gear drives, as will be described further hereinafter, by being capable of transmitting pure torque, exerted in two different regions lengthwise of the driving sides of the teeth. A pair of gears meshes only in one zone and transmits only a force; and bearings are needed to hold each gear in place. The coupling of the present invention meshes simultaneously in two diametrically opposite zones; and because the tooth loads are balanced no bearings are needed on one member. The coupling referred to permits some displacement, also, axially of the internal member.

Since there are two regions of mesh located on diametrically opposite sides of the coupling a further intersection line 77a can be determined in like manner for that portion of each external tooth of the coupling which gets into mesh in the other region as the coupling rotates. At one and the same instant, one external coupling tooth 72 is in mesh with an internal coupling tooth 65 along region 77 of this tooth 72, and the diametrically opposite coupling tooth 72 is in mesh with a diametrically opposite internal coupling tooth 65 along region 77a of that diametrically opposite tooth 72. The two lines 77 and 77a are symmetrical with respect to a mid-plane 81 which is perpendicular to the axis 67 of the externally toothed inner member, and which passes through the intersection point 71 of the axes 66, 67. The normals n for the portion 77a of a tooth side are shown in the right hand bottom quadrants of Figs. 7 and 8, and in the lower left hand portions of Figs. 6 and 9. The two branches 77, 77a of a side of a tooth 72 intersect at an angle, and eliminate some of each others potential mesh, the mesh at the dotted portion 77'.

The opposite sides of the teeth 72 have similar lengthwise intersection profiles 77b and 77c. Each side of a tooth 72 comprises two branches 77, 77a, or 77b, 77c which meet at an angle. Also, each side surface of a tooth 72 is composed of two portions meeting in a central ridge.

The lengthwise intersection profiles of the teeth in other cylindrical sections coaxial with axis 67 can be similarly determined, so that the entire tooth shape is known. This is the tooth shape of the externally toothed inner member of a fixed angle coupling, a shape which can be produced in a generating operation with a tool which in operation describes one or more teeth of the internally toothed outer member.

The lengthwise intersection profiles 77, 77a, 77b, 77c, in a cylindrical section 78 coaxial with the externally toothed inner member are longitudinally convex, and have a varying curvature. The curvature radii increase with increasing distance from the center of the teeth 72, that is, with increasing distance from a mid plane 81 that is perpendicular to the axis 67.

As is also shown in Fig. 16 hereafter each tooth surface of the inner member has a ridge 107 that lies in the midplane of said inner member. Fig. 24 shows this ridge. This ridge has a smaller inclination to a line radial of the aligned axes 66, 67, than the involute tooth profile 65' of the outer member 64, so that the ridge 107 contacts the profile 65' only at the outer end 107' of the ridge. This can be demonstrated mathematically. The inclination of the ridge depends on the angle $i$ which the tooth surface portions of the inner member at the ridge include with the direction of the axis of the inner member. The normal $d$ at any point 75 of the involute profile 65' is tangent to the base circle 73. The normal $u$ at the corresponding point 75' of the ridge has a larger distance X from the axis 67 than the radius $r_b$ of the base circle 73, while points 75, 75' have equal radii. It can be shown that distance X amounts to:

$$X = \frac{r_b}{\cos i}$$

This distance is a measure of the change of inclination of the ridge as compared with the involute profile 65'.

Fig. 10 shows external coupling teeth 83 with lengthwise profiles 85 consisting of parts 79, 79a, on one side of the teeth, and of parts 79b, 79c on the other sides of the teeth in a developed mean cylindrical surface. They are shown in relation to a longitudinally straight tooth 84 of the mating internally toothed outer member when the pair of coupling members is set to zero shaft angularity. The teeth then have backlash. The profiles 79 are similar to the profiles 77 of Fig. 9, but are for more moderate fixed shaft angularity.

Dotted lines 85' indicate the profiles of the same cylindrical section, as in Fig. 10, of an externally toothed inner coupling member that will run at a smaller fixed shaft angularity with the same internally toothed outer member as shown in Fig. 10. The branches 86, 86a of the lengthwise profiles of the teeth of the externally toothed inner coupling member, are less inclined to each other than branches 79, 79a; and their teeth have less backlash when the coupling members are set to zero shaft angularity. The branches 86c, 86b of the lengthwise profiles of the opposite sides of the teeth of this coupling member are also less inclined to each other than the branches 79b, 79c.

Fig. 11 shows a combination of the two lengthwise profiles 85 and 85', the profile 85 occupying the outer ends of the teeth and the profile 85' occupying the central portion. The points 87' are the points of junctures of the different lengthwise profile portions. A coupling, such as illustrated in Fig. 11, could run at two shaft angularities that correspond to the profiles 85 and 85', respectively.

Fig. 12 shows that a great many lengthwise profiles 87, 88, 89, etc. can be combined, each corresponding to a different shaft angularity. The lengthwise profiles so overlap along the axis of the externally toothed inner member that they occupy nearly equal distances on the composite lengthwise profile 90. For each shaft angle within range there is about the same length of lengthwise profile 90. Fig. 12 also shows that the combination of infinitely many lengthwise profiles, each occupying an infinitesimal and approximately equal portion of profile 90, is possible. This composite lengthwise profile is a smooth curve, and approximately a circular arc at the small shaft angularities mostly used.

Fig. 13 shows a modified combination of a great many lengthwise profiles, so combined together that the outer portions 91 of the composite lengthwise profile are larger than the more centrally located portions 92. The profile 93 is actually smooth and contains an infinite number of infinitesimal portions 91, 92 increasing in relative length towards the ends 94 of the teeth. The profile 93 has varying curvature. Its central portion has the minimum radius of curvature 95, while the outer portions have gradually increasing radii of curvature 96. With this disposition, the larger shaft angularities are given more bearing surface than the smaller ones to offset the increased amount of tooth sliding and the decreased intimacy of contact.

Fig. 14 shows an opposite combination of the many lengthwise individual profiles, each corresponding to a different shaft angularity. Here the profile 97 of tooth 98 has its maximum radius of curvature 99 in the central portion while the curvature radius 100 becomes smaller toward the tooth ends. The combination may be used when the coupling runs at small shaft angularities nearly all the time, and only occasionally at the angularity of the design limit.

The teeth shown in Figs. 12 to 14 have the same design limit. The couplings containing such teeth have no backlash at the design limit, but they have increasing backlash the more the shaft angularity differs from the design limit. They are shown at zero shaft angularity in relation to the longitudinally straight tooth sides 101 of the internal member.

The modification shown in Fig. 13 departs least from the lengthwise profile 85 (Fig. 10) that corresponds to the shaft angularity of the design limit. It replaces the sharp corner at the middle of the length of the teeth of the latter with an arc of its minimum curvature radius 95. It also has the least amount of backlash at zero shaft angularity, of the several couplings shown in Figs. 12 to 14.

Figs. 15 and 16 are each a fragmentary axial section through an externally toothed inner member of a fixed angle coupling. They compare a coupling conjugate to an internally toothed outer member having plane toothed sides with a coupling conjugate to an internally toothed outer member having involute tooth sides.

Both tooth surfaces 105 and 106 have a longitudinally central ridge 107 extending from top to bottom of its teeth. They have, however, differently directed lines of instantaneous contact 110 and 111, respectively, which in the considered turning position pass through a mean point 112. The line of contact 110 of the tooth side of the externally toothed inner member with the meshing plane tooth surface of the mating internally toothed outer member is a straight line. It is the projection of instantaneous axis to said plane tooth surface.

At each point of the line of contact 110, the members have a common tangent plane which coincides with the plane tooth side of the internally toothed outer member and has a constant distance from the intersection point 71 of the axes of the two members. This characteristic holds for all fixed shaft angularities. The tooth surface of each of the members contains a whole system of straight lines and has a common tangent plane at all points of any one of such straight lines.

When it comes to combining the tooth surfaces corresponding to all shaft angularities within a given range, in the manner described in connection with Figs. 12 to 14 inclusive, in an externally toothed inner coupling member, which is conjugate to an internally toothed outer coupling member having plane tooth sides, the surface elements join each other tangentially as do the elements of the curves shown in said figures. They join each other along straight lines, such as line 110 (Fig. 15), along which they have a common tangent plane, at a constant distance from intersection point 71. What remains of the tooth surface of a fixed-angle externally toothed inner member on the composite tooth surface is a straight line 110 and a land of infinitesimal width following said line. This line gets into contact simultaneously along its entire length, and thus effects the required 1:1 velocity ratio only for an instant.

Conditions are different with involute teeth and broadly with teeth of ample profile curvature. With involute teeth, the surface of action of every fixed angle coupling is made up of straight lines $a$, $b$, $c$, $d$, $e$ (Figs. 6 to 9), that are normal to the contacting tooth surfaces. These lines intersect a tooth surface at the line of instantaneous contact of said tooth surface, such as line 111 of Fig. 6. It is a line amply inclined to the depthwise direction of the teeth. The straight lines of action have corresponding lines on the tooth surfaces of both members, the locus of the surface points, which successively coincide with the points of a straight line of action. They appear as generally depthwise lines similar to line 110 of Fig. 15, and amply inclined to the instantaneous line of contact 111.

In operation, the line 111 sweeps the tooth surface between the ridge 107 and the tooth end 119. The tooth portion 113 between the ridge 107 and the opposite tooth end 114 is swept by a line 111' when the tooth has rotated to a diametrically opposite region of contact.

When the tooth surfaces corresponding to all shaft angularities within the limit range are combined, the surface elements join each other tangentially on said depthwise lines. These get into contact gradually, so that the uniformity of the motion is preserved.

We can take the developed lengthwis profiles of Figs. 12 to 14 inclusive, erect a plane normal to a lengthwise profile at any of its points, and determine the surface normal at that point, that is, the line of action. It lies in the normal plane and is so inclined to the drawing plane that the aforesaid torque requirement is fulfilled. This can be repeated for the other points.

One way of defining the tooth surface of a gear is by the shape of the tooth surface of its rack. We have already the developed lengthwise profile of a cylindrical section of a gear or coupling member. This is also the pitch line of a rack whose pitch plane rolls on said cylindrical surface. The motion of this rack is in the direction of the gear periphery, that is, in the horizontal direction in the drawing plane of Figs. 12 to 14. The said surface normals are also the lines of action for defining the rack teeth. Each line of action corresponds to a strip of a plane tooth surface of the rack.

All the surface normals at points of a considered developed profile (Figs. 12 to 14) have a constant inclination to the direction of the rack travel so that they fulfill the said kinematic requirement. For this reason, the tooth surface of a basic rack can be considered composed of elements of conical surfaces of constant cone angle, whose axes extend in the direction of rack travel.

It is possible to have a basic rack whose tooth sides are each a single conical surface. The axis of this surface is perpendicular to the drawing plane of, for instance, Fig. 3, and it may be at 55 or at 43, or elsewhere. The tooth surface of the basic rack may also be a composite of an infinite number of conical surfaces, whose parallel axes may lie for instance in a forked curve 115 (Fig. 18). These conical surfaces have a constant cone angle, and axes perpendicular to the drawing plane of Fig. 18.

The mesh of a universal coupling so constructed is along a straight line of action in each mesh region, a line which corresponds to the cone element of the basic rack. To transmit true uniform motion continuously the teeth should be deep enough that the length of each line of action within the boundaries of mating teeth is larger than the normal base pitch. The normal base pitch is the normal distance from one another of adjacent involute tooth surfaces on the same side of the teeth. The above requirement is the same that exists on involute spur gears.

The distribution of curvature in the sectional profiles (Figs. 12 to 14) is generally reflected in the shape of the tooth bottom. Fig. 12 corresponds to a tooth bottom of approximately constant curvature, like tooth bottom 56 of Fig. 3. Fig. 13 corresponds to a tooth bottom 120 more curved at the middle and less curved at the ends, see Fig. 18. At the middle it has a curvature radius 121 and a curvature center 122, while it has a curvature center 123 and a larger curvature radius near the tooth ends.

Fig. 17 indicates a way of reducing the tooth depth at the ends of the teeth. The tooth bottom 130 is rolled out only to the design limit, determined by the shaft angularity desired, between the points 131 and 132. Outwardly of these points the root surface may have a straight profile 133; or it may even have a concave profile if rolled out a little further.

Fig. 19 is a fragmentary axial section like Fig. 18 showing the intersection line 134 between a side tooth surface of the externally toothed inner member of the coupling and a plane which passes through mean point 135 of the working profile and which contains the axis of the coupling member. The crowning obtained in accordance with Fig. 19 is such that line 134 has a varying radius of curvature. The radius of curvature 135—136 is a minimum at the middle of the tooth; and at the end points 137 of the working length of the teeth, the radius of curvature 137—138 is at least 50% greater than at the middle. Curved line 134 is more crowned than the tooth bottom 120, and comes nearer to the tooth bottom 120 at the tooth ends. It has a smaller curvature radius than an axial section of the tooth bottom. The side surface of the tooth along intersection line 134 is correspondingly curved.

Production

Fig. 20 illustrates diagrammatically cutting of an externally toothed inner coupling member 140 by a threaded tool member, such as a hob 141, which is indicated diagrammatically by its outside surface 142. The hob has an axis 143 whose central point 144 may move in a circle 145 about an axis 146. The position of the latter defines the crowning of the teeth of the coupling member. In conventional production the hob axis 143 remains parallel to itself in all feed positions and parallel to the position $143_0$ at the middle. It performs a circular translation relative to member 140. This is different from a turning motion about axis 146, which would place the hob axis in the dotted position 143' at a constant distance from the axis 146.

In the bodily motion of the hob 141, only the central point 144 and points projected into this point move about the axis 146. All other points of the hob move about other axes, thus point 147 of the hob axis moves about an axis 146' in an arc of the same radius as radius 144—146. The point of the hob, that coincides with mean pitch point 150 in the middle position, is at 150' in the hob position shown, and arc 150—150' has also a radius equal to radius 144—146.

This circular translatory motion affects the shape of the tooth surfaces produced. It can be demonstrated mathematically in a lengthy way that the produced tooth surfaces are not exactly symmetrical lengthwise to a central plane (43—53 in Fig. 3), perpendicular to the axis 44 of the externally toothed inner member. Instead of a symmetrical lengthwise sectional profile 52' (Fig. 3) an unsymmetrical lengthwise profile is obtained, as shown exaggerated in dash lines at 154 in Fig. 3. This lengthwise profile has the same curvature as lengthwise profile 52' at mean point 53 but departs from profile 52' in opposite directions at the two sides.

This departure increases sharply with increased crowning, that is, with increasing design limits of the shaft angularity. It also increases with increasing lead angle of the hob, to which the hob is set. It is negligible on fine-pitch couplings for small shaft angularities, produced by single threaded hobs. On these, the concave curvature of the base line 58 (Fig. 4) is not discernible.

It is obvious that a symmetrical tooth form is preferable to an unsymmetrical one. Lack of symmetry disturbs the mesh and tends to throw the external member off center. Also, when it is desired to maintain concentricity of the coupling members by contact of the top surfaces of the crowned teeth of the external member with the tooth bottoms of the straight teeth of the internal member, the load may be carried in one region instead of in two diametrically opposite regions. This stresses the teeth and the guide surfaces unduly.

Even if the threaded member 141 is turned about axis 146, and its turning axis is moved from a position 143' to $143_0$ and beyond, there is still a departure from exactly symmetrical teeth, at least in principle. It might be supposed that the line of action between the hob thread and the final tooth surfaces of the external member intersects the drawing plane at a point 150" at the same distance from axis 146 as mean point 150; but that is not so. A force acting along the line of action through point 150 exerts turning moments on the hob and external member in the proportion of the numbers of their respective threads and teeth. If in the feed position shown, the line of action would remain equally positioned with respect to axis 146 and pass through point 150", the said force acting along it would exert the same turning moment as before on the hob, but a smaller turning moment on the external member. This is because point 150" has a smaller distance from the turning axis of the external member than point 150. Accordingly, the above proportion would not be attained. If the line of action were passed through point 151, the said turning moment would be the same as in the central position on the external member; but the turning moment exerted on the hob would be smaller, because of the decreased distance of point 151 from the hob axis 143'. Accordingly, the line of action passes through neither point 150" nor point 151.

It can be shown that the lines of action of opposite tooth sides intersect the drawing plane at two different points, and that the tooth surfaces obtained are not quite symmetrical with respect to a mid-plane perpendicular to the turning axis. There are, therefore, two sources of error. One is the circular translation of the hob. The other is the helical nature of the threads. The latter error is negligibly small where the customary single thread hobs are used. It has, however, some effect with shaving tools that have multiple threads or teeth.

Unlike hobs, shaving tools are not positively timed to rotate in time with the work during operation; the timing is dependent upon the engagement of the shaving tool and of the work piece. The turning position of a shaving tool is adapted to the tooth shape already existing on the workpiece. For this reason, only a fraction of the error which would result, if the shaving tool were embodied as a hob, becomes effective in shaving. If a shaving tool is moved for instance about axis 146, so that its axis moves from 143' to $143_0$ and beyond, while its central point 144 describes the circular arc 145, the chip thickness may vary, depending on its number of teeth and its diameter. A shaving tool, which will just contact both sides of the crowned teeth of the work in the middle position, may be clear of the work near the end positions.

To keep the shaving tool in contact with both sides of the teeth its depthwise position may have to be changed near the tooth ends. In other words, the feed path should be modified. At the center the required feed path has the same curvature as arc 145. At the ends it should then be differently curved. Instead of being an arc of a circle, the feed path is then more nearly a portion of an ellipse.

A relative feed motion about an axis 146, as described, can also be attained by tilting the workpiece about axis 146. In addition to this turning motion, the tool and workpiece are moved depthwise relatively to one another near the ends of the feed path. When this is done, a constant depth of shaving cut is attainable also on couplings for ample shaft angularities. The shape of the feed path required is the same as the path of a shaving tool that remains in contact with both sides of the crowned teeth. It can be determined in the shop; it can also be computed. A true turning motion about axis 146 is readily attainable with shaving tools because of the absence of outside timing.

Several ways of avoiding the errors above described will now be disclosed.

Both errors may be avoided in accordance with my invention by setting the hob square, that is, so that its axis is parallel to the axis about which it is fed. This is indicated in Figs. 21 to 23. In Figs. 21 and 22, the two sides of the teeth are considered separately. The workpiece 160 is cut with a hob diagrammatically shown at 161 having an axis 162. The hob has an involute helical thread whose base cylinder is denoted at 163. In operation, it is fed about an axis 164 parallel to the hob axis 162 and perpendicular to the direction of the work axis.

If the lines of action in the central plane 165 are to intersect the drawing plane at a pitch point 166, then the lead of the hob, or its axial pitch, should be equal to the circular pitch of the coupling member at the pitch radius 164—166. Its thread inclination in a plane 165 parallel to the hob axis should be equal to the pressure angle at that point; and its thread should be somewhat thinned up as compared to conventional hobs.

As the hob axis is fed in a circular path 168 about axis 164, the hob is moved as if rigid with a part rotatable on axis 164. A turning angle 166—164—167 is added to the hob rotation, this turing angle being the angle between the projected lines of action 165, 165'. In this way the above errors are avoided and symmetrical tooth surfaces are attained.

The line of action 165' intersects the drawing plane at a point 167 at the same distance from the work axis as point 166 has. It is inclined at the same angle to the drawing plane as line 165.

On the other side of the teeth (Fig. 22) the base cylinder 163' of the hob lies on the opposite side of the projected line of action. The hob axis describes however the same circle 168.

Fig. 23 shows how both sides of the teeth may be simultaneously cut. On one side of the teeth, the finishing action is along a line 165a and on the opposite side along the line 165b. Both lines intersect the axis 164 and are tangent to the base cylinder 163 on opposite sides. The lines of action intersect the drawing plane in spaced points 169.

The added turning angle of the hob required is the angle described by axis 162 on circle 168, and is proportional to the arc described on that circle. At the moderate shaft angularities mostly used, it may be made proportional to the feed component extending along the work axis. In other words the sine of the angle may be substituted for the arc at small angles. This can be done with the differential ordinarily used on hobbing machines for cutting helical teeth.

A hob 161 so set and fed about axis 164 with proper change of the timing produces tooth sides that are conjugate to a conical rack-tooth surface whose axis coincides with axis 164. Other shapes may be similarly obtained. Still other ways of cutting the external coupling members of the present invention, and a machine for this purpose are described in my parent application Serial No. 582,961 above mentioned.

While the invention has been described in connection with several different embodiments thereof, it will be understood that it is capable of further modifications; and this application is intended to cover any variations, uses, or adaptations of the invention following, in general, the principles of the invention and including such departures from the present disclosure as come within known or customary practice in the art to which the inventions pertain and as may be applied to the essential features hereinbefore set forth and as fall within the scope of the invention or the limits of the appended claims.

Having thus described my invention, what I claim is:

1. A toothed coupling comprising an internally toothed outer member with longitudinally straight teeth and an externally toothed inner member with longitudinally crowned teeth engaging said straight teeth, said straight teeth having concavely curved depthwise tooth profiles in planes perpendicular to the axis of said outer member, said crowned teeth having mean depthwise profile inclinations decreasing towards both ends of the teeth, the side surfaces of said crowned teeth having a base line turned up at both ends, so that it has a larger distance from the axis of said externally toothed inner member at both ends of the teeth than at the tooth middle, said distance being exactly equal at equal distances from a plane that is perpendicular to the axis of said inner member and is midway of the length of the teeth.

2. A toothed coupling comprising an internally toothed outer member with longitudinally straight teeth and an externally toothed inner member with longitudinally crowned teeth engaging said straight teeth, said straight teeth having concavely curved involute depthwise tooth profiles, said crowned teeth having depthwise tooth profiles which are convex and whose mean inclination decreases towards both tooth ends, and the side surfaces of said crowned teeth having a base line extending at a larger distance from the axis of said externally toothed inner member at both end of the teeth than at the tooth middle, said side surfaces being exactly symmetrical to a mid-plane perpendicular to the axis of said inner member.

3. A toothed coupling comprising an internally toothed outer member with longitudinally straight teeth and an externally toothed inner member with longitudinally crowned teeth engaging said straight teeth, said straight teeth having concavely curved depthwise tooth profiles said crowned teeth having curved tooth bottoms and side surfaces with convex depthwise tooth profiles whose mean inclination decreases towards both tooth ends, said side surfaces being more crowned than corresponds to the tooth bottom curvature so that an axial section laid through the mean point of the working profile of a crowned tooth has a smaller radius of curvature than an axial section of the tooth bottom.

4. A toothed coupling comprising an internally toothed outer member with longitudinally straight teeth and an externally toothed inner member with longitudinally crowned teeth engaging said straight teeth, said straight teeth having concavely curved depthwise tooth profiles, said crowned teeth having curved tooth bottoms and side surfaces with convex tooth profiles depthwise whose mean inclination decreases towards both tooth ends, said side surfaces being more crowned than correspond to the tooth bottom curvature, so that an axial section laid through the mean point of the working profile of a crowned tooth has a smaller radius of curvature than an axial section of the tooth bottom, the mean curvature center of the last-named section lying on the axis of said externally toothed inner member.

5. A toothed coupling comprising an internally toothed outer member with longitudinally straight teeth and an externally toothed inner member with longitudinally crowned teeth engaging said straight teeth, said straight teeth having concavely curved tooth profiles, said externally toothed inner member having a spherical outside surface and a spherical root surface both of which have a common center on the axis of said inner member, said crowned teeth having side surfaces with depthwise convex tooth profiles whose mean inclination decreases towards both tooth ends, said side surfaces being more crowned than corresponds to the tooth bottom curvature so that an axial section laid through the mean point of the working profile of a crowned tooth has a curvature center located between the axis and said mean point.

6. A toothed coupling comprising an internally toothed outer member with longitudinally straight teeth and an externally toothed inner member with longitudinally crowned teeth engaging said straight teeth, said straight teeth having concavely curved depthwise tooth profiles, said crowned teeth having side surfaces with convex depthwise tooth profiles whose mean inclination decreases towards both tooth ends, said side surfaces being so crowned that an axial section laid through the mean point of the working profile of a crowned tooth has a varying radius of curvature, said curvature radius being equal at the two ends and different at the middle of the teeth.

7. A toothed coupling comprising an internally toothed outer member with longitudinally straight teeth and an externally toothed inner member with longitudinally crowned teeth engaging said straight teeth, said straight teeth having concavely curved depthwise tooth profiles, said crowned teeth having side surfaces with convex depthwise tooth profiles whose mean inclination decreases towards both tooth ends, said side surfaces being so crowned that an axial section laid through the mean point of the working profile of a crowned tooth has a varying radius of curvature, said curvature radius being smallest at the middle of the teeth and increasing towards both ends of the teeth, and being at least 50% larger at the ends of the working length of the teeth than at said middle.

8. A toothed coupling to run at a fixed shaft angularity of at least ten degrees, comprising an internally toothed outer member with longitudinally straight teeth and an externally toothed inner member with longitudinally crowned teeth engaging said straight teeth, the side surfaces of said crowned teeth being composed of two portions meeting in a longitudinally central ridge, each of said side surfaces having a convex profile of distinct and varying curvature in a mean cylindrical section coaxial with said inner member and developed into a plane, the curvature radii in said section increasing with increasing distance from the center of the teeth.

9. A toothed coupling to run at a small range of shaft angularities with a minimum angularity of at least ten degrees, comprising an internally toothed outer member with longitudinally straight teeth and an externally toothed inner member with longitudinally crowned teeth engaging said straight teeth, said straight teeth having concavely curved depthwise tooth profiles, said crowned teeth having convex depthwise tooth profiles whose mean inclination decreases towards both tooth ends, the side surfaces of said crowned teeth being composed of two portions meeting in a longitudinally central ridge, each of said side surfaces having a convex profile of varying curvature in a mean cylindrical section coaxial with said inner member and developed into a plane, the curvature radii in said section increasing with increasing distance from the center of the teeth.

10. A toothed coupling comprising an internally toothed outer member with longitudinally straight teeth and an externally toothed inner member with longitudinally crowned teeth engaging said straight teeth, the side surfaces of said straight teeth having concavely curved depthwise profiles, each joined to the tooth bottom profile by a fillet intersecting said side profile at an angle and providing clearance, said crowned teeth having longitudinally curved tooth bottoms and longitudinally convex outside surfaces adapted to bear against the tooth space bottoms of said straight teeth, said crowned teeth also having side surfaces with convex depthwise tooth profiles whose means inclination decreases towards both tooth ends, said side surfaces being more crowned than corresponds to the tooth bottom curvature of the crowned teeth, so that an axial section laid through the mean point of the working profile of a crowned tooth has a smaller radius of curvature than an axial section of the tooth bottom of such a tooth.

11. In combination, an internally toothed outer member and an externally toothed inner member adapted to transmit true uniform motion and meshing with each other at an approximately fixed shaft angularity of at least ten degrees, the side surfaces of the teeth of said inner member having each a central ridge extending depthwise of the teeth and being adapted to engage and mesh with said outer member in two diametrically opposite regions so that opposite loads are transmitted in said opposite regions, which loads add up to a turning moment.

12. In combination, an internally toothed outer member and an externally toothed inner member meshing with each other at a fixed shaft angularity of at least ten degrees, each tooth side of said inner member being composed of two portions meeting in a ridge that lies in a central plane perpendicular to the axis of said inner member, each of said portions being convex in all directions, said tooth sides of said inner member meshing with the tooth sides of said outer member in two diametrically opposite regions so that opposite loads are transmitted in said opposite regions, which loads add up to a turning moment.

13. In combination, an internally toothed outer member having longitudinally straight teeth of involute profile shape, and an externally toothed inner member meshing with each other at a mean shaft angularity of at least ten degrees, said shaft angularity varying less than one quarter of its mean amount, each tooth side of said inner member being composed of two portions meeting in a ridge that lies in a central plane perpendicular to the axis of said inner member, said tooth sides having a constant pitch in the direction of the tooth surface normals, said pitch being equal to the base pitch of the profiles of said outer member, and said ridge having a smaller inclination to the radial direction than the involute profile of said outer member, so that said ridge contacts said profile only at the outer end of said ridge when said two members are set to zero shaft angularity.

14. In combination, an internally toothed outer member having longitudinally straight teeth and an externally toothed inner member meshing with each other at a mean shaft angularity varying less than one quarter of its mean amount, each tooth side of said inner member being composed of two portions meeting in a ridge that lies in a mid-plane perpendicular to the axis of said inner member, said ridge being less inclined to the radial direction than the tooth profile of said outer member, so that said ridge contacts said profile only at the outer end of said ridge when said two members are set to zero shaft angularity.

15. In combination, an internally toothed outer member and an externally toothed inner member having the same number of teeth and meshing with each other at a shaft angularity of at least ten degrees, said outer member having longitudinally straight teeth extending parallel to its axis, said inner member having teeth adapted to engage said straight teeth, each tooth side of said inner member being composed of two portions meeting in a ridge that lies in a central plane perpendicular to the axis of said inner member, the longitudinal profile of each of said portions being convex in a cylindrical section coaxial with said inner member and developed into a plane, the radius of curvature of said longitudinal profile increasing with increasing distance from said ridge.

References Cited in the file of this patent

UNITED STATES PATENTS

| 2,638,011 | Smith | May 12, 1953 |
| 2,682,760 | Shenk | July 6, 1954 |
| 2,744,449 | Belden et al. | May 8, 1956 |
| 2,841,966 | Belden et al. | July 8, 1958 |